(12) United States Patent
Ansari

(10) Patent No.: US 6,176,341 B1
(45) Date of Patent: Jan. 23, 2001

(54) VEHICLE STEERING SYSTEM HAVING MASTER/SLAVE CONFIGURATION AND METHOD THEREFOR

(75) Inventor: Adil Ansari, Kokomo, IN (US)

(73) Assignee: Delphi Technologies, Inc., Troy, MI (US)

(*) Notice: Under 35 U.S.C. 154(b), the term of this patent shall be extended for 0 days.

(21) Appl. No.: 09/240,804

(22) Filed: Feb. 1, 1999

(51) Int. Cl.$^7$ ....................................... B62D 5/00
(52) U.S. Cl. ................................................ 180/402
(58) Field of Search .................... 180/402, 403, 180/446, 444, 445; 33/203, 203.18

(56) References Cited

U.S. PATENT DOCUMENTS

| | | | |
|---|---|---|---|
| 5,251,135 | * 10/1993 | Serizawa et al. | 364/424.05 |
| 5,908,457 | * 6/1999 | Higashira | 701/41 |
| 6,012,540 | * 1/2000 | Bohner et al. | 180/402 |
| 6,035,251 | * 3/2000 | Hac et al. | 701/70 |
| 6,041,882 | * 1/2000 | Bohner et al. | 180/402 |
| 6,059,068 | * 5/2000 | Kato et al. | 180/402 |
| 6,069,505 | * 5/2000 | Babanezhad | 327/156 |
| 6,072,293 | * 6/2000 | Shimizu et al. | 318/432 |

* cited by examiner

Primary Examiner—Lanna Mai
Assistant Examiner—Kevin McKinley
(74) Attorney, Agent, or Firm—Jimmy L. Funke

(57) ABSTRACT

A steer-by-wire steering system for a vehicle which provides force feedback to the hand-operated steering wheel to allow an operator of the vehicle to feel forced opposition to the steerable road wheels. The steering system includes a road wheel actuator for actuating an associated road wheel, and a position sensor for sensing angular position of the road wheel. The steering system also includes a hand-operated steering wheel for controlling directivity of the road wheel, a steering wheel sensor for sensing position of the steering wheel, and a steering wheel actuator for actuating the hand-operated steering wheel. A controller receives a sensed steering wheel position and sensed road wheel position and calculates the control signal as a function of the difference therebetween. The controller commands the road wheel actuator to provide controlled steering of the road wheel in response to the control signal, and to further command the steering wheel actuator to provide forced feedback actuation to the hand-operated steering wheel in response to the control signal.

15 Claims, 3 Drawing Sheets

VEHICLE STEERING SYSTEM HAVING MASTER/SLAVE CONFIGURATION AND METHOD THEREFOR

BACKGROUND OF THE INVENTION

The present invention generally relates to a vehicle steering system and, more particularly, to a vehicle steer-by-wire steering system providing road wheel force feedback to the hand-operated steering wheel.

Land vehicles are commonly equipped with a set of road wheels that rotate to allow easy movement of the vehicle. Automotive vehicles are conventionally equipped with a pair of front wheels that are controllably steerable to enable the vehicle to turn left and right as it maneuvers on land. In the past, vehicle steering systems commonly employed a direct mechanical connection between the hand-operated steering wheel and the steerable wheels, which typically included the front two wheels, of an automotive vehicle. As an operator rotated the hand-operated steering wheel, a mechanical linkage through the vehicle's tie-rods actuated the steerable road wheels in either the left or right direction, generally with the assistance of a power-assisted steering motor.

Recently, steer-by-wire steering systems have been introduced into automotive vehicles to provide easy-to-steer road wheel control. Included in a typical steer-by-wire steering system is a steering wheel subassembly for monitoring the angular position of the steering wheel, wheel actuation controllers, and corresponding electric motor actuators for controlling actuation of the individual wheels. The steer-by-wire steering system turns the road wheels left and right with the motor actuators which in turn are controlled by controllers in response to tracking the sensed position of the steering wheel. In contrast to prior steering systems, the steer-by-wire steering system does not employ a mechanical linkage between the steering wheel and the individual steerable wheels. For safety and reliability, the steer-by-wire steering system generally employs redundant steering wheel sensors, redundant controllers, and redundant motor actuators.

In the conventional steer-by-wire vehicle steering system, torque sensors are generally employed to sense forces which deflect the steerable road wheels, such as when a vehicle road wheel forcibly contacts a roadside curb or other opposing object. The torque sensor signals are read by a local controller and sent to a hand wheel controller via a bus. The hand wheel controller uses the torque signals to actuate the hand wheel motor to provide rotational resistance such that the operator of the vehicle may feel resistance to turning the road wheel. However, the use of torque sensors adds additional components to the steering system, which increases the cost, as well as requires low noise signal conditioning circuitry and hardware/software compensation to correct for non-linearity of the torque sensors. Further, torque sensors are generally susceptible to error due to drift over temperature and often require calibration.

Accordingly, it is therefore one object of the present invention to provide for an efficient steering system for a vehicle which provides steering resistance to the hand-operated steering wheel in response to resistance of the road wheels. It is a further object of the present invention to provide for a vehicle steering system and method for steering the road wheels of a vehicle equipped with a steer-by-wire steering system. It is yet another object of the present invention to provide for a vehicle steer-by-wire steering system and method that does not require additional torque sensors and other components associated therewith to provide feedback to the hand-operated steering wheel.

SUMMARY OF THE INVENTION

The present invention provides for a steer-by-wire steering system and method for steering a vehicle by controlling steering of one or more vehicle road wheels and providing force feedback to the hand-operated steering wheel so that the vehicle operator may feel steering force resistance. The vehicle steering system includes a position sensor for sensing angular position of a road wheel, a hand-operated steering wheel for controlling directivity of the road wheel, a steering wheel sensor for sensing position of the steering wheel, a steering wheel actuator for actuating the hand-operated steering wheel, and a controller for receiving the sensed steering wheel position and the sensed road wheel position and calculating control signals, preferably including a road wheel control signal and a steering wheel control signal, as a function of the difference between the sensed road wheel position and the steering wheel position. The controller commands the road wheel actuator to provide controlled steering of the road wheel in response to the road wheel control signal. The controller further commands the steering wheel actuator to provide feedback force actuation to the hand-operated steering wheel in response to the steering wheel control signal. The road wheel control signal and steering wheel control signals are preferably scaled to compensate for difference in gear ratio between the steering wheel and the road wheel. In addition, the road wheel control signal and steering wheel control signal may each have a gain set so that the road wheel control signal commands greater force actuation to the road wheel than the feedback force applied to the steering wheel.

The method of steering a vehicle having a steer-by-wire steering system according to the present invention includes the steps of sensing position of a hand-operated steering wheel and sensing position of a road wheel. The method further includes calculating a control signal as a function of the difference between the sensed road wheel position and the sensed steering wheel position. The control signal preferably includes a road wheel control signal and a steering wheel control signal which may be scaled to compensated for gear ratio differences. The method further includes the steps of commanding actuation of the road wheel in response to the road wheel control signal to provide controlled steering of the road wheel, and commanding actuation of the hand-operated steering wheel in response to the steering wheel control signal to provide force feedback to the hand-operated steering wheel.

The present invention preferably implements two position control loops, one for the road wheel and one for the hand wheel. The position feedback from the steering wheel becomes a position command input for the road wheel control loop and the position feedback from the road wheel becomes a position command input for the steering wheel control loop. A road wheel error signal is calculated as the difference between the road wheel command input (steering wheel position feedback) and the road wheel position. Actuation of the road wheel is commanded in response to the road wheel error signal to provide controlled steering of the road wheel. A steering wheel error signal is calculated as the difference between the steering wheel position command (road wheel position feedback) and the steering wheel position. The hand-operated steering wheel is actuated in response to the steering wheel error signal to provide force feedback to the hand-operated steering wheel.

These and other features, advantages and objects of the present invention will be further understood and appreciated by those skilled in the art by reference to the following specification, claims and appended drawings.

DETAILED DESCRIPTION OF THE PREFERRED EMBODIMENT

Figure 1:
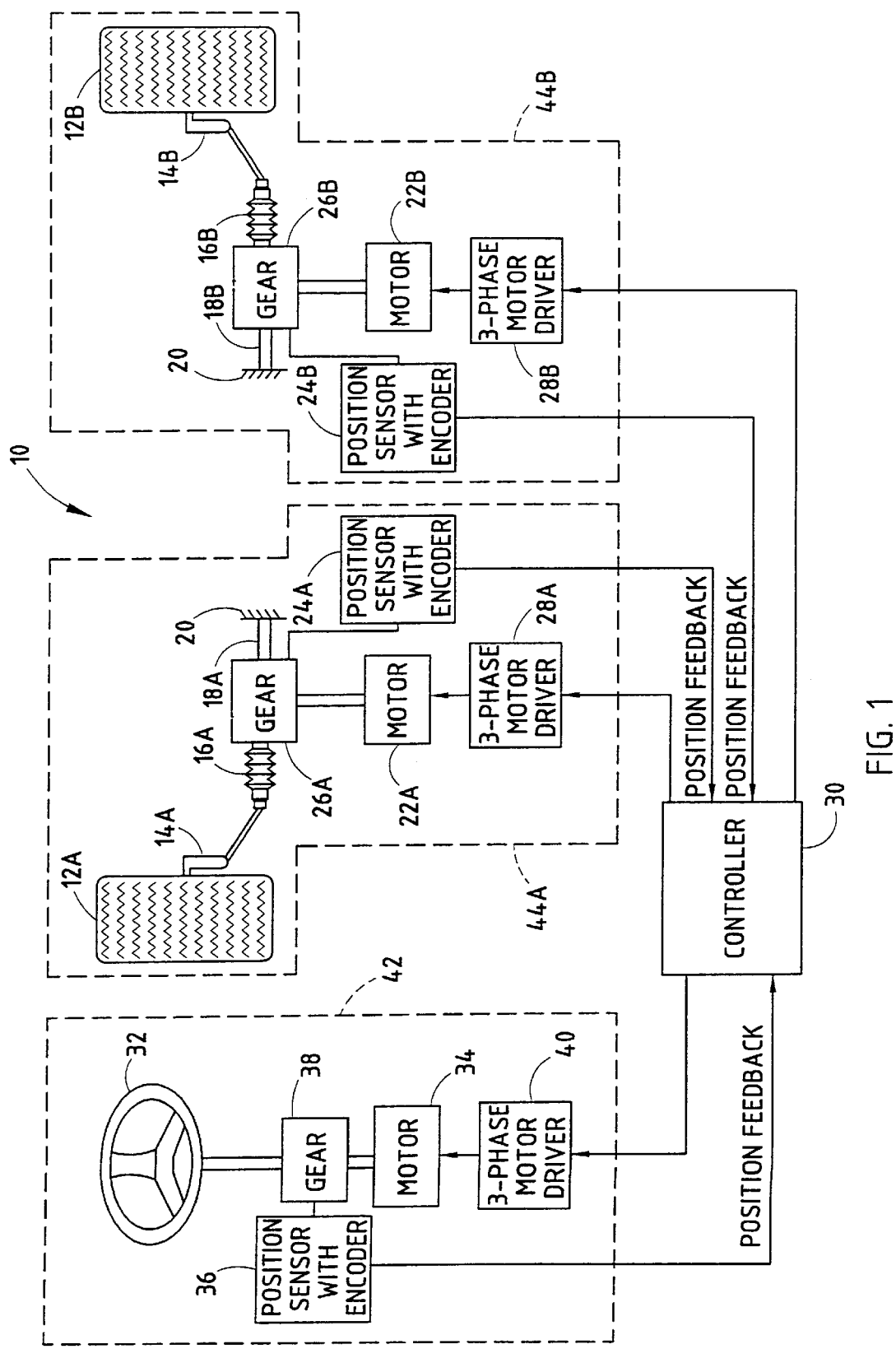
FIG. 1 is a block diagram illustrating a vehicle steer-by-wire steering system configured to provide vehicle steering according to the present invention.

Referring to FIG. 1, a steer-by-wire steering system 10 for an automotive vehicle is shown configured according a master/slave configuration for providing road wheel control and force feedback to the hand-operated steering wheel according to the present invention. The vehicle steer-by-wire steering system 10 as shown includes a pair of road wheels 12A and 12B, such as the front wheels on a front wheel steered vehicle. Wheel 12A, also referred to as the left wheel, is connected to a drive linkage 14A, which in turn is connected to bellows 16A mounted on an axle 18A of the vehicle. The axle 18A in turn is mounted to the vehicle frame 20. A motor actuated gear 26A is coupled to the axle 18A to actuate the drive linkage 14A and turn left wheel 12A. Wheel 12B, also referred to as the right wheel, is connected to a drive linkage 14B which in turn is connected to bellows 16B. Bellows 16B is connected to axle 18B which is in turn connected to the vehicle frame 20. A motor actuated gear 26B is coupled to the axle 18B to actuate drive linkage 14B and turn right wheel 12B.

According to the vehicle steer-by-wire steering system 10, each steerable road wheel of the vehicle 10 is movably actuated with an actuator motor in response to control signals from a controller 30. In particular, an actuator motor 22A is linked to gear 26A for actuating the left wheel 12A so that wheel 12A turns left or right. Motor 22A is electrically driven by a 3-phase motor driver 28A which receives a control signal from controller 30. In addition, a digital position sensor 26A, which preferably includes an encoder, is provided to monitor the angular position of road wheel 12A. The digital position sensor 26A may measure the yaw angle position of the wheel either directly, or indirectly through the actuator motor 22A or gear 26A as shown. The monitored angular position of wheel 12A as generated by sensor 24A is fed back to road wheel controller 24A as a position feedback signal.

The right wheel 12B of the vehicle's steer-by-wire steering system 10 likewise includes an actuator motor 22B for actuating the right wheel 12B through gear 26B to turn the wheel 12B left or right. Actuator motor 22B is electrically driven by a 3-phase motor driver which is also controlled by the controller 30. In addition, a digital position sensor 22B, preferably including an encoder, monitors the angular position of wheel 12B. The yaw angular position of wheel 12B can be measured either directly or indirectly through the actuator motor 22B or gear 26B as shown. The monitored angular position of wheel 12B is likewise input to the controller 30 as a position feedback signal.

Together, road wheel 12A and its drive assembly components, the actuator motor 22A, gear 26A, position sensor 24A, and 3-phase motor driver 28A, provide for a road wheel steering assembly 44A for independently steering road wheel 12A. Likewise, road wheel 12B and its drive assembly components together with the gear 26B, actuator motor 22B, 3-phase motor 28B, and the position sensor 24B makeup a road wheel steering assembly 44B for independently steering road wheel 12B. Accordingly, the left and right road wheels 12A and 12B, respectively, are independently steered by independently controlled motor actuators as part of the corresponding road wheel steering assembly 44A and 44B.

The vehicle steer-by-wire steering system 10 also includes steering wheel assembly 42 which has a hand-operated steering wheel 32 that is intended to be manually rotated by the driver of the vehicle to steer the vehicle. Steering wheel 32 is equipped with a motor 34 and a gear coupled to the steering wheel shaft that serves to provide force feedback resistance to the operator, in response to turning resistance of the road wheels. In addition, the steering wheel 32 may also serve to provide power steering assistance and, in effect, provides easy and controlled steering. The motor 34 is electrically driven by a 3-phase motor driver 40 that receives a control signal from controller 30. A digital position sensor 36, which preferably includes an encoder, monitors the rotational position of the steering wheel 32, either directly from the steering wheel shaft or indirectly from the motor 34, or gear 38 as shown, and provides a steering wheel position feedback signal to the controller 30.

The master controller 30 controls the vehicle's overall steering operation, and could be configured as a single processor or multiple processors. The master controller 30 may include a general purpose microprocessor-based controller, that may include a commercially available off-the-shelf controller. One example of a controller that may be used includes Model No. 87C196CA microcontroller manufactured and made available from Intel Corporation. Controller 30 preferably includes a processor and memory for storing and processing software algorithms. Controller 30 processes sensed vehicle information and provides output control signals to control one or more road wheels 12 and to provide force feedback to the hand-operated steering wheel 32. The controller 30 preferably has a clock speed of 16 MHz, two optical encoder interfaces to read position feedbacks from each of the actuator motors, a pulse width modulation output for each motor driver, and a 5-volt regulator.

The steering wheel system 10 of the present invention employs a master/slave configuration for controlling the steering of the vehicle's road wheels 12A and 12B and providing a force feedback to the hand-operated steering wheel 32. The master/slave configuration designates the steering wheel assembly 42 as the master system, and each of the road wheel assemblies 44A and 44B as independent slave systems. By criss-crossing the feedbacks from the master system and each of the slave systems, any position displacement in one actuator of one of the master and slave systems affects the drive of the actuator in the other of the master and slave systems.

Figure 2:
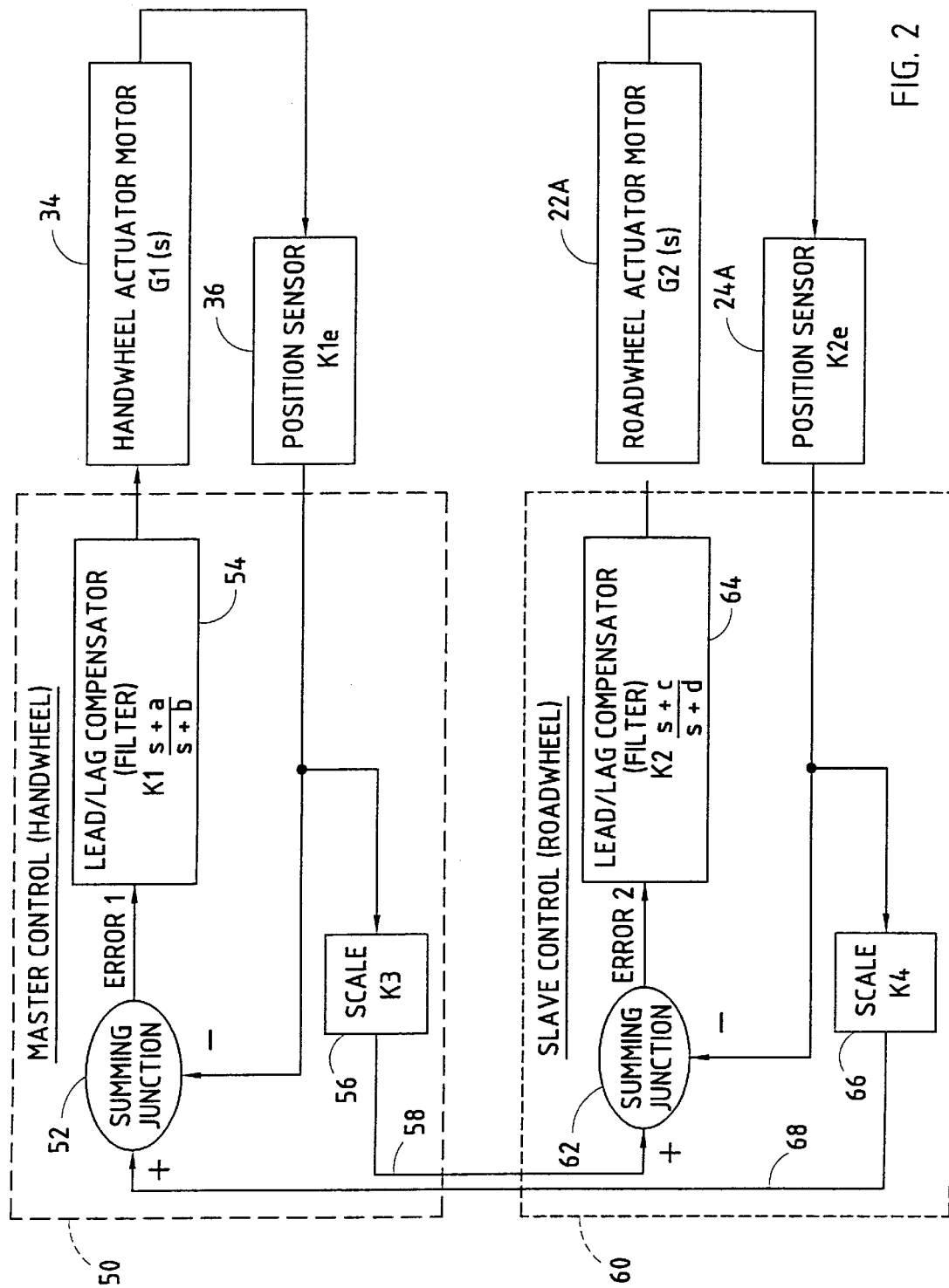
FIG. 2 is a block diagram illustrating a master/slave configured control loop for controlling the vehicle steering system of the present invention.

In order to effect control of the master/slave configured vehicle steering system 10, the master controller 30 is preferably configured with software to provide both master control of the hand-operated steering wheel, as well as slave control of each of the road wheels. Referring to FIG. 2, one embodiment of a master/slave configured control loop for controlling the vehicle steering system is shown according to the present invention. The controller 30 includes a master control loop 50 for controlling the hand-operated steering wheel 32, and a slave control loop 60 for controlling a designated road wheel.

The master control loop 50 receives a position feedback signal from the digital position sensor 36 indicative of the sensed angular position of the steering wheel 32. In addition, the master control loop 50 receives a scaled position feedback signal from the slave control loop 60 indicative of the relative position of the road wheel. The master control loop 50 subtracts the steering wheel position feedback signal from the scaled road wheel position feedback signal as shown at summing junction 52 to provide error signal ERROR1. The subtracted output signal ERROR1 from summing junction 52 is provided as an input to a lead/leg compensator 54. The lead/leg compensator 54 provides filtering to filter out error signals. The lead/leg compensator 54, operates as a filter to smoothen out the signal and provide system stability. The lead/leg compensator 54 has a gain identified by reference numeral K1. The lead/leg compensator 54 provides an output which is used to control the steering wheel actuator motor 34 to provide force feedback to the steering wheel 32. Accordingly, the master control loop 50 provides force feedback to the hand-operated steering wheel 32 when the relative angular position of the steering wheel 32 and road wheel are not equal. The amount of feedback force is dependent both on the difference in the positional feedback signals as well as the gain K1 of the lead/leg compensator 54.

The slave control loop 60 is employed to control steering of the road wheel in response to operator actuation of the steering wheel 32. The slave control loop 60 receives a road wheel position feedback signal indicative of the position of the road wheel from position sensor 24A. In addition, slave control loop 60 receives the steering wheel position feedback signal as scaled by the master control loop 50. The slave control loop 60 subtracts the road wheel position feedback signal from the scaled hand wheel position feedback signal as shown by summing junction 62, and provides an output signal ERROR2 to a lead/leg compensator 64. In effect, the summing junction 62 detects a difference in the relative position of the road wheel and the steering wheel. If a difference in the angular position of the steering wheel exists relative to the road wheel, the lead/leg compensator 64 filters out noise and provides an output control signal to actuate the road wheel motor 22A to bring the road wheel into position relative to the hand-operated steering wheel.

Accordingly, the slave control loop 60 drives the road wheel actuator motor 22A to actuate the road wheel whenever the relative position of the road wheel and the steering wheel are not equal. In addition, the master control loop 50 provides a force feedback to the steering wheel 32 whenever the road wheel and steering wheel angular positions are not equal. Of course, the amount of force actuated upon the road wheel is much greater than the force feedback to the steering wheel. This can be realized by setting the master control gain K1 to a much lower value than slave gain K2. The amount of force feedback applied to the steering wheel is enough to provide feel to the operator of the vehicle whenever there is a forceful opposition applied to the road wheel.

Figures 3, 4:
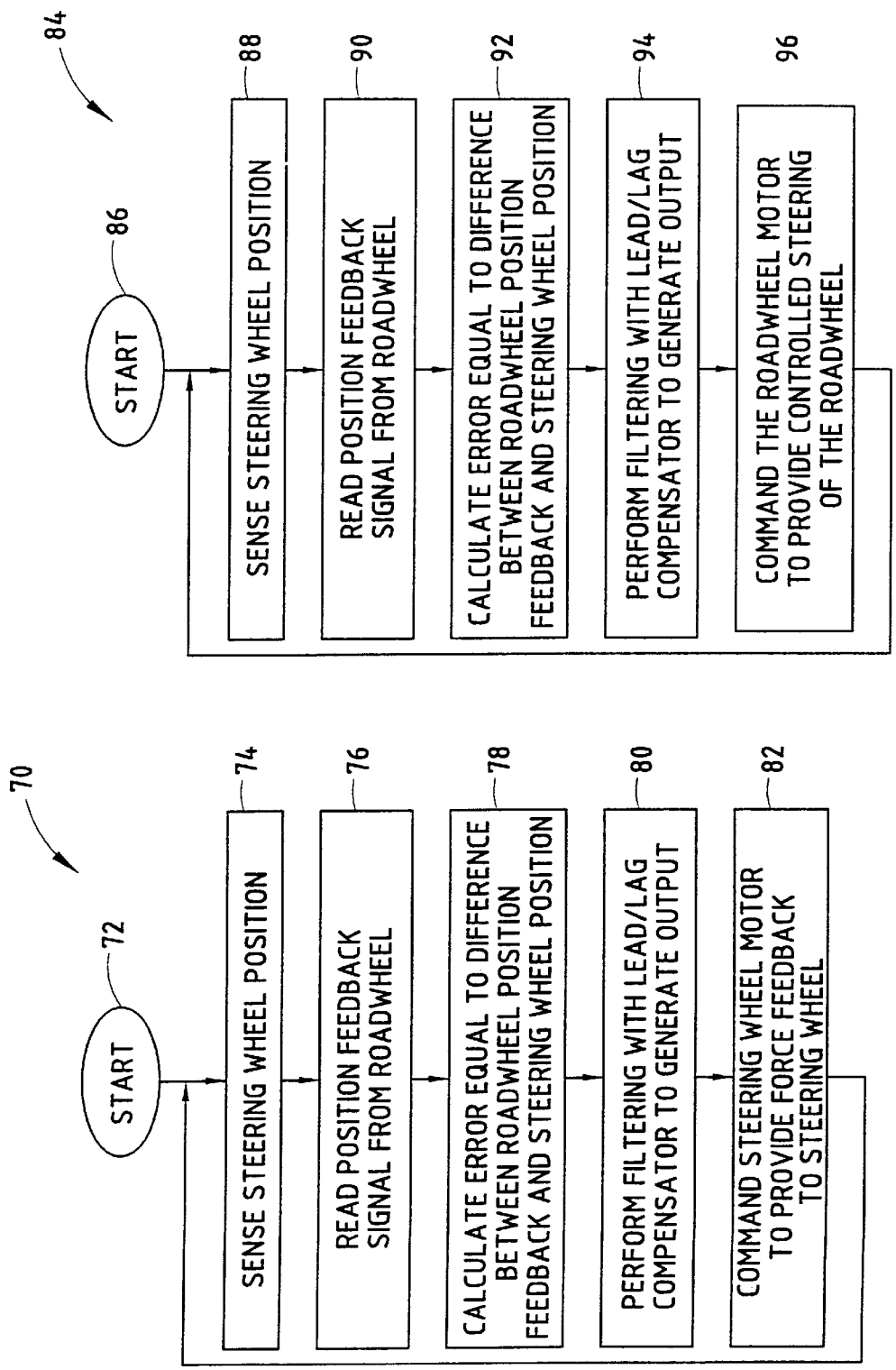
FIG. 3 is a flow diagram illustrating a methodology for controlling a vehicle road wheel according to the present invention.
FIG. 4 is a flow diagram illustrating a methodology for controlling a hand-operated steering wheel with force feedback according to the present invention.

Referring to FIG. 3, the master control loop methodology 70 is illustrated for providing force feedback to the steering wheel 32. Methodology 70 starts with step 72, and proceeds to sense the steering wheel position in step 74, and further reads the position feedback signal from the road wheel in step 76. Next, master control loop methodology 70 calculates an error equal to the difference between the road wheel feedback signal and the steering wheel position signal in step 78. Proceeding to step 80, methodology 70 performs filtering with the lead/leg compensator and generates an output signal. In step 82, the output signal is used to command the steering wheel motor to provide force feedback to the steering wheel, which allows the steering wheel operator to feel resistance when forces oppose the road wheel. The master control loop methodology 70 is repeated during normal vehicle operation.

Referring to FIG. 4, a slave control loop methodology 84 is illustrated for commanding control of a road wheel. Slave control loop methodology 84 starts at step 86 and proceeds to sense the hand wheel position in step 88, and to read the position feedback signal from the road wheel in step 90. Next, in step 92, methodology 40 calculates an error equal to the difference between the road wheel feedback and the steering wheel position signal. Proceeding to step 94, methodology 84 performs filtering with the lead/leg compensator to generate an output signal. In step 96, the output signal is used to command the road wheel actuator motor to provide controlled steering of the corresponding road wheel. The slave control loop methodology 84 is repeated during normal vehicle operation.

The control loops and methods described herein are based on a single road wheel actuator for controlling a single road wheel. The same control and method can be adapted for controlling two or more road wheel actuators for two or more road wheels on a vehicle. In order to control two road wheels with the steering wheel system 10 of the present invention, the position feedback from the hand wheel controller may be fed as inputs to both of the two road wheel controllers. The position feedbacks from both the road wheels and the road wheel position may be fed as an inputs to the hand wheel controller. In addition, the steering wheel system may be configured with one or more back-up systems.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

The invention claimed is:

1. A steering system for steering a vehicle comprising a road wheel;

an actuator for actuating said road wheel of said vehicle:

a position sensor for sensing angular position of said road wheel;

a hand-operated steering wheel for controlling directivity of said road wheel;

a steering wheel sensor for sensing position of said steering wheel;

a steering wheel actuator for actuating said hand-operated steering wheel; and a controller for receiving said sensed steering wheel position and said sensed road wheel position and calculating a control signal as a function of the difference between said road wheel position and said steering wheel position, said controller commanding the road wheel actuator to provide controlled steering of the road wheel in response to said control signal, said controller further commanding the steering wheel actuator to provide force feedback actuation to the hand-operated steering wheel in response to said control signal.

2. The steering system as defined in claim 1, wherein said control signal includes a road wheel control signal for controlling steering of the road wheel and a steering wheel control signal for controlling actuation of the steering wheel, wherein said road wheel control signal and said steering wheel control signals are scaled to compensated for a difference in gear ratio between said steering wheel and said road wheel.

3. The steering system as defined in claim 1, wherein said road wheel control signal has a gain substantially greater than a gain of said steering wheel control signal so that said road wheel is actuated at a substantially greater force than actuation of said hand-operated steering wheel.

4. The steering system as defined in claim 1, wherein said controller further performs filtering of said control signal.

5. The steering system as defined in claim 1, wherein said road wheel position sensor and said hand-operated steering wheel sensor each comprises a digital position sensor.

6. The steering system as defined in claim 5, wherein said digital position sensor further comprises an encoder.

7. A steer-by-wire steering system for a vehicle equipped with one or more road wheels, said system comprising:
   a road wheel actuator for actuating said road wheel;
   a position sensor for sensing angular position of a steerable road wheel;
   a hand-operated steering wheel for controlling directivity of said road wheel;
   a steering wheel sensor for sensing position of said steering wheel;
   a steering wheel actuator for actuating said hand-operated steering wheel; and
   a controller for receiving said sensed steering wheel position and said sensed road wheel position and calculating a road wheel control signal and a steering wheel control signal both as a function of the difference between said road wheel position and said steering wheel position, said controller commanding the road wheel actuator to provide controlled steering of the road wheel in response to said road wheel control signal, said controller further commanding the steering wheel actuator to provide force feedback actuation to the hand-operated steering wheel in response to said steering wheel control signal.

8. The steer-by-wire steering system as defined in claim 7, wherein said road wheel control signal and said steering wheel control signal are scaled relative to each other to compensate for a difference in gear ratio between said steering wheel and said road wheel.

9. The steer-by-wire steering system as defined in claim 7, wherein said road wheel control signal has a gain substantially greater than a gain of said steering wheel control signal so that said road wheel is actuated at a substantially greater force than actuation of said hand-operated steering wheel.

10. The steer-by-wire steering system as defined in claim 7, wherein said controller further performs filtering of said control signal.

11. A method for steering a vehicle having a hand-operated steering wheel and one or more road wheels, said method comprising the steps of:
   sensing position of the hand-operated steering wheel;
   sensing position of a road wheel;
   calculating a control signal as a function of the difference between said sensed road wheel position and said sensed hand-operated steering wheel position;
   commanding actuation of the road wheel in response to said control signal to provide controlled steering of the road wheel; and
   commanding actuation to the hand-operated steering wheel in response to said control signal to provide force feedback to said hand-operated steering wheel.

12. The method as defined in claim 11, wherein said step of calculating a control signal includes determining a road wheel control signal for commanding actuation of said road wheel and a steering wheel control signal for commanding actuation of said steering wheel, and scaling said road wheel control signal relative to said steering wheel control signal to compensate for a difference in gear ratio between the road wheel and the steering wheel.

13. The method as defined in claim 11 further comprising a step of performing filtering of the difference signal.

14. The method as defined in claim 12, wherein said step of determining a road wheel control signal and a steering wheel control signal includes providing a substantially higher gain to said road wheel control signal than said steering wheel control signal so that said step of commanding actuation of the hand-operated steering wheel comprises providing a substantially lesser force feedback to said steering wheel in contrast to force actuation applied to said road wheel.

15. The method as defined in claim 11 further comprising the steps of:
   sensing position of another road wheel;
   comparing a position feedback from said one and said another road wheels; and
   inputting said road wheel position feedback to said controller if said position feedback is from said one and said another road wheels are substantially equivalent.

* * * * *